(12) United States Patent
Long, Jr. et al.

(10) Patent No.: US 7,135,155 B1
(45) Date of Patent: Nov. 14, 2006

(54) VELOCITY INDUCED CATALYZED CAVITATION PROCESS FOR TREATING AND CONDITIONING FLUIDS

(75) Inventors: Palmer Long, Jr., Shreveport, LA (US); Jim Gregath, Oklahoma City, OK (US); David D. Leavitt, Broken Arrow, OK (US); Thomas M. Leonard, Tulsa, OK (US); William G. Lea, Broken Arrow, OK (US)

(73) Assignee: Hydrotech Solutions, L.L.C., Tulsa, OK (US)

( * ) Notice: Subject to any disclaimer, the term of this patent is extended or adjusted under 35 U.S.C. 154(b) by 462 days.

(21) Appl. No.: 10/717,113

(22) Filed: Nov. 19, 2003

Related U.S. Application Data

(60) Provisional application No. 60/427,693, filed on Nov. 21, 2002.

(51) Int. Cl.
*B01J 10/00* (2006.01)
(52) U.S. Cl. ..................... 422/224; 422/129
(58) Field of Classification Search ............... 422/129, 422/224
See application file for complete search history.

(56) References Cited

U.S. PATENT DOCUMENTS 5,695,721 A * 12/1997 Kitagawa et al. .......... 422/99
5,723,041 A * 3/1998 Devanathan et al. ....... 208/158
6,716,360 B1 * 4/2004 Titmas ....................... 210/750
7,022,295 B1 * 4/2006 Bilardello et al. .......... 422/227

* cited by examiner

Primary Examiner—Glenn Caldarola
Assistant Examiner—Alexis Wachtel
(74) Attorney, Agent, or Firm—Molly D. McKay

(57) ABSTRACT

The present invention provides an apparatus and a method for a catalytic cavitation reactor comprising an inner pipe having a wall with plurality of spaced apart radially bored inner pipe holes located thereon. A second pipe having a wall with plurality of spaced apart radially bored second pipe holes is also provided. The inner pipe is located within and joined to the second pipe. Within the interior of the second and out pipes are lengths of static mixing baffles. An outer pipe is also provided. The second pipe is located within and joined to the outer pipe. Within the interior of the second and out pipes are lengths of static mixing baffles. A plurality of nozzles are provided wherein each of the inner pipe holes and second pipe holes receives one of the plurality of nozzles. Each of the plurality of nozzles has an inlet end, an outlet end and a constriction therebetween. A catalytically active zone is formed between the constriction and the outlet end.

17 Claims, 3 Drawing Sheets

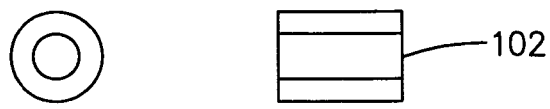
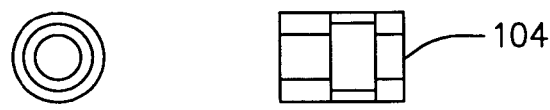
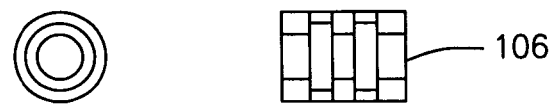
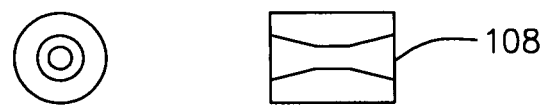
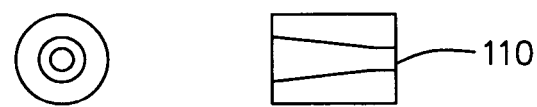
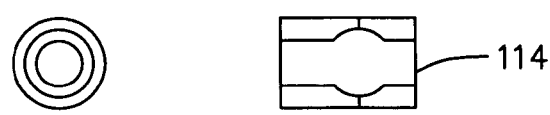
Fig. 6

VELOCITY INDUCED CATALYZED CAVITATION PROCESS FOR TREATING AND CONDITIONING FLUIDS

REFERENCE TO PENDING APPLICATIONS

This application claims benefit of U.S. Provisional Patent Application Ser. No. 60/427,693 filed on 21 Nov. 2002 entitled VELOCITY INDUCED CATALYZED CAVITATION PROCESS FOR TREATING AND CONDITIONING FLUIDS.

REFERENCE TO MICROFICHE APPENDIX

This application is not referenced in any microfiche appendix.

BACKGROUND OF THE INVENTION

1. Field of the Invention

The present invention relates to a method of and apparatus for treating and conditioning fluids. More particularly, the present invention relates to a method of and apparatus for treating and conditioning fluids, including liquids, gases and fluidized solids, using catalyzed hydrodynamic cavitation. The invention alters selected physical and chemical characteristics of selected components present in the fluids to catalyze desirable chemical reactions between constituents of the fluid and to encourage ionization of the fluids, facilitating the removal of harmful contaminants from the treated material. The invention is applicable to the beneficial treatment of many fluid systems, including the purification of water, enhanced recovery of crude oil, desulphurization of hydrocarbons, remediation of contaminated soil and the prevention of scale and corrosion.

2. Background

All industrial processes, water treatment operation and processes used to recover and utilize natural resources depend at some point upon the successful removal of undesirable contaminants or the recovery of desirable materials from fluids. The fluids referred to may be liquids, gases or slurries and the material separated from the fluids may be any material dissolved, emulsified suspended or solubilized in the fluid. The commonly known techniques for separating solids, liquid particles or gases from fluids include the following:

Filtration. Filtration usually refers to the use of granular media, filter cartridges or bag filters to remove suspended solids greater than 1 micron from fluids. Fluids are pumped through the filter material which strains out the suspended solids from the fluid. Filtration is effective where the solids are not emulsified or dissolved in the fluid. Filter media eventually becomes blinded off by the bulk of the collected particles, inhibiting the flow of fluid through the media, and must be cleaned by backwashing or the media must be replaced. Certain solids, such as iron sulfite, biomass and solidified hydrocarbons are difficult to filter because they form a slimy film over the filter media, blocking passage of the fluid through the media. Filtration is one of the most common industrial processes and filtration systems are employed in all fluid treatment applications. Filtration isn't an effective means to removed dissolved solids from fluids.

Precipitation. Precipitation is usually a chemical process whereby acids, bases or chelating compounds are added to a fluid in order to reduce the solubility of a contaminant in the fluid. Precipitation depends upon the solubility of the material in the fluid, the charge of the compound, temperature of the fluid and time. Chemicals must be added to the fluid and the resulting precipitate must then be separated from the fluid by some other appropriate method. The pH of the fluid may also have to be adjusted after the solids are removed. Precipitation is a useful way to removed dissolved solids from a fluid but may not always be economical because of the cost of the chemical used to facilitate the precipitation of the solids.

Decanting. Liquids having different specific gravities, i.e., oil and water, can be separated by allowing them to stand in a settling tank. The lighter liquid floats to the top of the heavier liquid and can be skimmed off. Decanting isn't instantaneous and time is required for the two liquids to separate. Skimming is usually inefficient and the two liquids are often not completely separated. Typically skimmed oil contains about 15% water and the separated water contains around 50 parts oil per million parts water. Skimming is not effective for removal of dissolved solids.

De-emulsification. Emulsions are intimate mixtures of two liquid phases, such as oil and water, in which the liquids are mutually insoluble and where either phase may be dispersed in the other. It is difficult to separate emulsified liquids. Stable oil-water emulsions are a colloidal system of electrically charges oil droplets surrounded by an ionic environment. Emulsions often contain suspended solids and other contaminants that cannot be separated from the fluid because of the emulsion. De-emulsification involves adding chemicals, typically strong acids and metal salts, to the fluid to add a positive charge to the emulsion droplets in order to neutralize their negative charges and cause the droplets to loose their attraction to each other. Once the liquid phases are neutralized, the two phases can be allowed to separate by settling or by coalescing processes. The pH of the one or more of the liquids in the fluid a may also have to be adjusted and the chemical de-emulsifiers may have to be removed after separation.

Ion-Exchange. Ion exchange removes contaminants from fluids by transferring them to a solid material that has affinity for the contaminants. The solid material, typically called ion exchange media or resin, accepts the contaminants and exchanges them for an equivalent amount of material stored in the ion exchange material. By this process, undesirable contaminants are exchanged for presumably beneficial or benign chemical compounds. Ion exchange is useful for the removal of dissolved solids from fluids when the fluid is not adversely affected by the presence of the new material. Ion Exchange media must be regenerated when all of the exchange sites are depleted. Ion exchange media is often quite expensive and ion exchange process are often undesirable because materials exchanged from the media may in themselves become new contaminants.

Degasification. Fluids may contain a variety of gases in solution that contaminate the fluid and are difficult to remove without specific degassing processes. Gases are held in solution in proportion to the partial pressure of the gas in the vapor space above the fluid/gas interface. Gases are removed by reducing the surface tension of the fluid and increasing the rate of diffusion of the gas through the fluid. Degasification processes typically involve atomization of the fluid in stripping towers, mechanical agitation of the fluid to shear the gas from the liquid or heating the fluid to increase gas diffusivity. Chemical agents that reduce the surface tension of the fluid are also used to facilitate the removal of dissolved gases. Equipment used for this purpose is expensive to build and operate, and many fluids are degraded by the addition of heat used to decrease the solubility of the gasses in the fluid.

Adsorption. Adsorption is the physical adhesion of molecules, especially organic molecules or colloids to the surfaces of the adsorbent material. Adsorption is particularly useful for removal of dissolved solids of high molecular weight. Like ion exchange, adsorption processes use media such as activated carbon for adsorption that has limited capacity and must be replaced periodically. Adsorption is not a cost-effective process for many fluid purification applications because of the high cost of the adsorption media and the problems and costs associated with disposal of the spent media now saturated with contaminants.

Membrane Separation. Membranes are porous barriers that will allow selected fluids to pass through while forming a barrier to particulates and dissolved solids. Fluid is pushed through the membrane by a pump or a compressor. A type of membrane process, reverse osmosis, is very useful for purifying water. Membranes are expensive and have to be replaced frequently because of degradation and because they are susceptible to fouling from biological organisms. Membranes also create a concentrated waste containing the contaminates that often must be disposed of as a hazardous waste material.

Centrifugation. Liquid or solid particles having higher specific gravities than the bulk fluid base can be separated by centrifugation. Here the heavier material is physically separated from the lighter material by centrifugal forces. Due to the weight of the fluid and the dynamic vibrations incurred, the centrifuges are both massive and expensive to operate.

Coagulation and Flocculation. Coagulation and flocculation are employed to separate suspended solids, particularly colloidal particles, from fluids. The process works by using chemicals to neutralize the negative charge on the surface of the particles and reduce the forces, as measured by the zeta potential of the particles, that keep the particles from agglomerating together. The process must occur in a slow mixing environment to allow enough time for agglomeration and settling of the particles out of the fluid. Flocculation takes time to allow the particles to settle and is effective for only a narrow range of particles. Coagulation and flocculation are usually ineffective to removed dissolved solids, separate emulsions or to separate hydrocarbons from water and other polar liquids. Once the particles are removed the fluid must be further purified by filtration or another similar operation.

Distillation. This method involves boiling the liquid and condensing the vapor. Distillation requires massive amounts of energy and is inefficient when the specific gravities of the liquid base and the solid or liquid particles are close together.

Coalescing Processes. Liquids having different specific gravities, i.e., oil and water, can be separated more rapidly when processed through a coalescer. The coalescing media forces small oil droplets suspended in the polar fluid to agglomerate together to form large droplets that more easily separate from the bulk fluid. The lighter hydrocarbons can then be skimmed off of the bulk fluid. Coalescers are not effective for conditioning fluids to prevent scale formation or for the removal of dissolved solids.

Oxidation Reduction. Oxidation-reduction processes, or Redox processes, are used to chemically change the nature of a contaminant in a fluid so that it can be more easily removed by mechanical separation operations or by precipitation. Chemicals are added to a fluid to either oxidize or reduce a contaminant, changing soluble ionized compounds into stable and insoluble complexes. Redox processes involve the transfer of electrons between compounds, frequently within electrolytic cells. Oxidation-reduction processes that depend upon the addition of chemicals to remove contaminants are often not cost-effective because of the cost of the chemicals.

Electrostatic Precipitation. Electrostatic precipitation processes are similar to Redox processes in that a charged surface is created that has an affinity for positively charged contaminants. The use of an electrochemical processes to clarify and purify waste water streams is described in U.S. Pat. No. 6,238,546 issued to Kneiper whereby a pair of electrodes are immersed in the fluid in a treatment chamber and DC current is passed through the fluid between the electrodes. The process is reported to induce a static charge on the waste particles in the fluid, inducing them to coalesce and agglomerates. The equipment used to generate the electric charge in the fluid is usually quite expensive to purchase and operate.

Redox Media. Specialized water conditioning media, called Redox media, can also be used to condition and ionize fluids that passes through the media. Redox cells and Redox media are structured so that one component of the cell or media acts as an anode and the other component acts as the cathode. In the presence of a fluid, electrons flow from the anode to the cathode thereby becoming available to react with positively charged contaminants in the fluid, causing them to plate out on the anode and be removed from the fluid. Redox media and its uses are described in U.S. Pat. No. 5,559,456, entitled "Fluid Treatment Utilizing a Reticulated Foam Structured Media Consisting of Metal Particles;" and U.S. Pat. No. 5,757,400, entitled "Reticulated Foam Structured Fluid Treatment Element." issued to Fanning and Garret.

Many other new processes have been proposed to remove contaminants or recover materials from fluids. These processes are in some cases experimental or unproven. The most promising of these new processes include cavitation and fluid ionization:

Cavitation. A practical definition of cavitation is the formation and collapse of vapor cavities in a flowing liquid. These vapor cavities can form anywhere in a flowing liquid where the local pressure is reduced to that of the liquid vapor pressure at the temperature of the flowing liquid. (Perry's Chemical Engineer's Handbook, 6th Edition 1984, McGraw-Hill) Cavitation is a physical condition whereby bubbles and cavities within a fluid are created by a localized pressure drop in the fluid. The low pressure zones are produced by local increases in fluid velocity as in eddies or vortices and can be caused by a propeller blade moving at great speed though a fluid, by an impeller operating at a high rpm in a fluid or by movement of a fluid through a restriction or a nozzle. Cavitation can also be generated in a fluid by the application of ultrasound energy.

Fluid exposed to these conditions may undergo a dramatic decrease in pressure to the point whereby the liquid reaches its boiling point, creating a great number of vapor-filled cavities and bubbles. The pressure drop is typically very short in duration and when the bubbles are projected further into the bulk of the liquid an equally dramatic increase in pressure imposed from the bulk fluid causes the collapse of the bubbles and the void spaces. According to some studies, the rapid expansion and collapse of the bubbles brought about by the cavitation pressure impulses have been shown to expose fluids to extremely high localized temperatures and pressures, with temperatures reportedly as high as 5,000 degrees Kelvin and pressures as high as 500 kg/cm (K. S. Suslick, Science, Vol. 247, 23 March 1990, pgs 1439–1445).

Cavitation is usually an uncontrolled and destructive condition but cavitation processes are reportedly useful for water purification and the destruction of hazardous wastes. Suslick describes a process called hydrodehalogenation whereby MoC catalysts were prepared by a sonication cavitation procedure and used to remove Cl and F from halogenated hydrocarbons when both catalyst and halogenated hydrocarbons were processes through a cavitation reactor. The localized hot-spots created during cavitation are reported to be able to strip ligands away from metal complexes. (K. S. Suslick, Published DOE Report under DOE Award DEFG07-96ER14730, 21 November 1997)

Hydrodynamic cavitation is a variation of generalized cavitation that occurs during turbulent fluid flow and is characterized by large pressure differences that are generated within the turbulent fluid. Hydrodynamic cavitation is usually an uncontrolled and undesirable condition brought about by constricted flow of fluids through an orifice or a nozzle or by operation of a pump to transfer a mixture of gas and liquid.

Some processes, as described in U.S. Pat. No. 6,365,555 by Moser and other related patents, are reported to be able to control hydrodynamic cavitation in order to enhance mixing and promote chemical reactions in fluids. Cavitation is typically controlled through the use of sonication devices that impose controllable and measurable amount of force upon the fluid or by the use of specially designed nozzles that direct the flow of fluid undergoing cavitation in a controlled manner. Processes designed by Moser and others use controlled cavitation to create nanometer sized reaction products, typically nanometer sized particles of catalyst material, superconductors, pigments and specialized materials.

Fluid Ionizers. Fluid ionizers are allegedly able to separate immiscible particles from liquid mixtures or emulsions. The ionizers, also described as Ion Colliders by some references, operate by directing a stream of liquid under pressure which contains solid or liquid immiscible particles against the surface of a metal plate to induce the metal to give up electrons which then combine with the liquid molecules and with the particle molecules causing the similarly charged liquid and particles to repel and separate from each other. Fluid ionizers claim to purify fluids by ionizing the fluid and impinging the fluid against a catalytically active metal surface. The ionizer apparatus typically rely upon the principles of cavitation of a fluid through channels in the apparatus to force a jet or stream of the cavitation-induced bubbles of vaporized fluid to impinge upon a catalytically active metal surface. The cavitation-induced bubbles then collapse at the catalytically active metal surface, generating high temperatures and pressures at the catalyst surface that are reported to produce physical and chemical changes in the fluid.

One type of fluid ionizer, called an Ion Collider and described in U.S. Pat. Nos. 5,482,629 and 6,106,787 by Rippetoe specifiy the use of copper and nickel as the preferred metals for the collider surface since copper reportedly readily gives up electrons in the presence of nickel when bombarded by a stream of liquid. The Rippetoe collider consists of two spaced apart concentric metal cylinders or pipes where either both pipes are made of copper-nickel alloy or preferably both the inner surface of the outer cylinder and the outer surface of the inner cylinder are coated with a copper-nickel alloy. The wall of the inner cylinder contains a multiplicity of spaced apart radially bored holes and the exit end of the inner cylinder is capped. The opposite or entry end of the inner cylinder may have a filter screen to prevent entry into the Ion Collider of gravel or other large particles. The liquid is pumped under pressure into the inner cylinder causing a multiplicity of streams or jets to issue from the inner cylinder wall and bombard the inner surface of the copper-nickel wall of the outer cylinder. Electrons freed from the copper in the walls of the annular chamber between the two cylinders combine with both molecules in the base fluid and the particles, causing the particles to separate from the base fluid. Rippetoe patented the use of the Ion Collider for a number of applications including separation of emulsions; purification of water; enhanced recovery of crude oil; and the remediation of contaminated soil.

In U.S. Pat. No. 5,482,620, Rippetoe describes the use of the Ion Collider as a method and apparatus for separating immiscible solid or liquid particles such as oil from a liquid-based mixture or emulsion. The apparatus is as shown above. In U.S. Pat. No. 5,485,883 Rippetoe describes a method and apparatus to facilitate the economical recovery of crude oil from an oil well having a string of tubing which extends to the level of the underground reservoir of crude oil. Here an Ion Collider is attached to the lower end of the tubing in contact with crude oil in a crude oil reservoir. The Ion Collider apparatus consists of two spaced-apart cylindrical metal tubes whose common vertical axis coincides with the axis of the string of tubing. The collider's inner tube has its upper end capped and its lower end joined to the lower end of the outer tube whose upper end opens into the interior of the tubing, whereby the inner tube contains a multiplicity of spaced-apart holes in its cylindrical wall. The entire inner tube and the inner surface of the outer tube are made of an alloy of copper and nickel in which the copper comprises at least 80% of the alloy.

In U.S. Pat. No. 5,538,081 Rippetoe describes the use of a collider to facilitate the recovery of hydrocarbons from an underground reservoir. Here the collider is used to produce a quantity of negatively charged water which is then injected down an oil well and into the underground reservoir. Then a quantity of particles of a copper-nickel-zinc alloy are pumped down the oil well and into the underground oil reservoir. Optionally the alloy is followed by a quantity of frac sand pumped down the well and into the reservoir and followed by a sufficient volume of negatively charged water to flush the frac sand out of the well casing and wellbore and into the reservoir. The well is then shut-in to stabilize the particles of alloy and frac sand, if added, within the reservoir. The well is then reopened, allowing the water and gases formerly entrained within the reservoir to be expelled from the reservoir and the well, thereby leaving the alloy particles and frac sand, if used, within the reservoir to provide a path for the continuing flow or hydrocarbons to the wellbore.

Rippetoe further describes the use of a collider as part of a clarification system to purify water in U.S. Pat. No. 5,554,301. Here the system comprises a collision chamber having an entry aperture and an ion collider disposed in a central region therein. The ion collider reportedly treats the water and the contaminants with a plurality of free electrons. A separation chamber is disposed rearwardly of the collision chamber and is in flow communication with a first overflow weir for receiving the treated water and treated contaminants. An upstanding member in the separation chamber has a plurality of apertures sized to urge passage of the bulk of the treated contaminants through the apertures. A clarifying chamber is disposed rearwardly of the separation chamber and has a plurality of baffle plates obliquely oriented that urge upward flow of the treated water therethrough across the baffle plates. A water collection reservoir is disposed rearwardly of the clarifying chamber and is in flow communication with the clarifying chamber. A contaminant collection tank is disposed rearwardly of the water collection reservoir and is adapted with a contaminant receiving aperture that is in flow communication with a contaminant withdrawal trough in the clarifying chamber.

In still another related U.S. Pat. No. 6,036,849, Rippetoe describes a method of using a collider to remove hydrocarbons from soil and fluids. Here a collider is used to produce ionized water and the ionized water is mixed with the soil to facilitate the separation of the hydrocarbons from the soil.

As shown by the above patents, ion colliders appear to be a promising new fluid treatment and purification technology. Ion Colliders are reportedly able to ionize water and other fluids, producing reactive peroxide and hydroxyl compounds that readily oxidize undesirable contaminants or neutralize the opposing charges on solid contaminants, allowing them to be more easily removed by precipitation and filtration. In practice, however, ion colliders have been plagued by poor performance and variable results when used in commercial applications.

The poor and variable performance of ion colliders appears to be a function of the design, materials of construction and operation of the collider apparatus. In operation, colliders designed as described by Rippetoe in U.S. Pat. Nos. 5,482,629 and 6,106,787 often fail to generate true cavitation conditions within the fluids pumped through the holes in the inner chamber of the apparatus. Liquids pumped through the orifices may not cavitate or may cavitate in an uncontrollable manner so that the cloud of vapor bubbles fail to collapse at the catalytic surface. Uncontrolled cavitation that occurs in this manner is not effective as catalyzed cavitation and may fail to produce reactions at the copper-nickel catalyst surfaces.

In the Rippitoe apparatus, a significant gap of around 1.5 inches exists between the inner tube containing the orifices that project the liquid jet stream and the inner catalytically active wall of the outer tube. In practice, the gap would be filled with fluid which would have a tendency to diffuse, suppress and collapse any bubbles formed in the jet stream that exits from the orifices of the inner tube before the bubbles reach the catalytically active metal surfaces. Here the zone of cavitation would have too short of a life and thus would not generate the high temperatures and high pressures in the presence of a critical amount of the catalyst that are required to effectively change the physical and chemical properties of the fluids in a manner to efficiently separate contaminants and purify the fluid. Addition of a helix of wire made from catalytically active materials that is wound around the circumference of the inner pipe does not appear to be able to improve contact between the bubble cloud and the catalyst surface.

Impingement of a fluid without cavitation may not be sufficient to ionize a fluid in the Rippetoe collider. Simple impingement of a liquid jet stream against a copper-nickel surface in the absence of cavitation adjacent to that surface should not strip copper ions away from the surface. Copper-nickel alloys and copper-nickel metals are reported to have the highest corrosion resistance of all copper alloys and are particularly resistant to corrosion caused by fluid impingement. (Perry's Chemical Engineer's Handbook, 6th Edition 1984, McGraw-Hill). The addition of small amounts of zinc or silver would not have a particularly destabilizing effect upon the integrity of the alloy surface in the absence of true cavitation.

The Rippetoe inventions also appear to be too inflexible to be able to treat and condition a wide variety of fluids under a wide variety of process conditions. The Rippetoe patents specify a limited variety of catalytic surfaces and a simplified orifice structure for cavitating the fluid that would have a limited ability even in theory to catalyze a wide range of cavitation-induced reactions.

Accordingly, there is a need for a new method of and apparatus for utilizing hydrodynamic cavitation as an effective and low cost fluid treatment and conditioning process.

There is also a need for a method of removing impurities, including sulfur, from fluids including hydrocarbons and fuels and for re-mediating soil with minimal use of chemical treatment.

There is also a need to separate oil from aqueous fluids and break apart oil-in-water emulsions without the use of chemicals, clarifiers or coalescers.

There is also a need to purify water and to remove of dissolved solids from fluids, de-scale pipes and vessels, and condition fluid without the use of chemicals.

In addition, there is a need for a device and apparatus so constructed to employ catalyzed hydrodynamic cavitation in a controllable process to economically purify water and other fluids at low operating cost and moderate equipment cost compared to other fluid treatment processes.

SUMMARY OF THE INVENTION

The present invention achieves its intended purposes, objectives and advantages over the prior art devices through a new, useful and unobvious combination of component elements, which is simple to use, with the utilization of a minimum number of functioning parts, which is simple to use and has a minimum number of moving parts that are constructed of readily available materials. The invention can be manufactured at a reasonable cost because of the ease of assembly and testing.

The present invention differs from the commonly used methods of treating and conditioning fluids in that it provides rapid and inexpensive separation of the contaminants from the fluid liquid without the use of chemicals or expensive separation equipment.

This invention differs from ion colliders and other cavitation devices in: 1) its utilization of nozzles specifically designed to maximize caviation and promote catalysis within a zone of cavitation located within the barrel of the nozzels; 2) fabrication of the reaction area of the nozzles from various catalyst metals and materials; 3) fabrication of the restriction area of the nozzles out of hardened materials that resist erosion; 4) use of two catalyzed cavitation zones within a single cavitation device to promote multiphase reactions and transverse fluid flow; 5) incorporation of static mixers and turbulators in the line of the fluid flowing between the two catalyzed cavitation zones; and 6) utilization of ports within the catalyzed cavitation device whereby reagents can be injected to promote and enhance selected reactions within the cavitation zones or probes can be inserted to monitor and control the desired reactions.

The improvements incorporated into this invention and into the Reactors used to practice catalyzed cavitation enable the process to effectively alter the physical and chemical characteristics of selected components present in the fluids to catalyze desirable chemical reactions between constituents of the fluid and to encourage ionization of the fluids, facilitating the removal of harmful contaminants from the treated material. Because of the selection of various catalyzed materials and hardened materials in the fabrication of the nozzles, the catalyzed cavitation process of this invention can be operated with higher operating pressures and significantly greater fluid velocities compared with other colliders while maintaining control of the cavitation conditions.

In one aspect, the present invention provides use of velocity induced catalyzed cavitation to condition and treat fluids in order the physical and chemical characteristics of the treated liquids and gases. In its simplest form, the present invention comprises three spaced apart concentrically arranged metal cylinders or pipes. The three pipes may be made of a number of materials, including ferrous metal, non-ferrous metal, composite materials, PVC pipe or other relevant polymer pipe, fiberglass or metal alloy.

The inner pipe is open on one end and flanged so that it can easily be connected to the pipe supplying fluid to be treated. Between ¼ to ½ of the length of the inner pipe opposite the opening into the pipe contains a multiplicity of spaced apart radially bored, preferably identical, holes drilled through the wall of the pipe; and, the exit end of the inner pipe is capped. The inner pipe is itself enclosed and surrounded by a second pipe having a larger diameter than the inner pipe. The exit end of the second pipe is capped and the entrance end is capped by a solid flange having a concentric hole in its center through which the inner pipe is inserted into the interior of the second pipe, forming a leak-proof seal at the point where the flange meets the inner pipe. Between ¼ to ½ of the length of the second pipe opposite the exit end of the pipe contains a multiplicity of spaced apart radially bored, preferably identical, holes drilled through the wall of the second pipe. A length of static mixing baffles are inserted into the interior of the second pipe between the area containing the holes drilled into the inner pipe and the area containing the holes drilled into the second pipe. The static mixing baffles form a turbulator which serves to thoroughly mix the cavitated and catalyzed fluid that exits the inner pipe. The second pipe containing the inner tube is in turn enclosed and surrounded by an outer pipe having a larger diameter than the second pipe. The exit end of the outer pipe is open to permit the treated and conditioned fluid to exit the device. The entrance end of the outer pipe is capped by the same solid flange that serves to cap the entrance end of the second pipe. A length of static mixing baffles are also inserted into the interior of the second pipe downstream from the area containing the holes drilled into the second pipe. The static mixing baffles form a turbulator which serves to thoroughly mix the cavitated and catalyzed fluid that exits the second pipe.

The flange that seals off the outer pipe and second pipe ends is equipped with a number of ports or holes that open through the walls of the flange and into the interior of the second pipe and outer pipe. These ports are normally sealed off but can be opened to allow the insertion of any number of devices including: electrodes; tubes for the delivery of reagents; thermocouples; sensors or other related devices into the interior of the second pipe and outer pipe.

Nozzles are fitted into the multiplicity of spaced apart radially bored, preferably identical, holes drilled through the walls of the inner and second pipes. The nozzles are specially designed to create controlled, optimized cavitation and catalysis within the fluid passing through the nozzles. The nozzles form a constriction or vena-contracta through which the fluid is pumped under sufficient pressure so that the velocity of the fluid passing through the constriction is greatly increased, resulting in cavitation of the fluid exiting the constriction.

The constriction is formed of erosion resistant material including carbide, tungsten, quartz, stellite, titanium nitride, ceramics, alpha alumina, diamond and related hardened materials, that resist corrosion and stand up to the forces found in the high pressure, high velocity fluid environment. The constriction material may be made in the form of an insert that can be incorporated into the wall of the nozzle.

Adjacent to and directly downstream from the constriction, the nozzle is constructed from catalytically active materials, including cobalt, molybdenum, bismuth, lanthanum, iron, strontium, titanium, silver, gold, lead, platinum, tin, palladium, yttrium, zirconium, calcium barium, potassium, chromium, magnesium, manganese, copper, zinc and mixtures thereof. The catalytically active materials can also be plated or coated onto base material that forms the nozzle. In addition, the catalytic material can be alloys of iron, tin, nickel, aluminum, silver, copper and zinc and related alloys. Selection of the catalyst depends upon the type and nature of the chemical reaction to be promoted within the catalyzed cavitation zone.

The catalytically active area can be constructed in various dimensionally different shapes to maximize the surface area for catalyzed cavitation. Shapes include straight cylindrical barrels, single and multi-chambered cylinders, venturis, converging or diverging cones, threaded cylinders and ball or spherical chambered cylinders.

For the purpose of ionizing fluids, in particular water, the catalyst material is chosen from a group of materials that are most susceptible to ionization in the presence of an electrically conductive fluid. Such materials are typically composed of two dissimilar metals alloyed together that differ greatly in their electro-chemical potentials.

These metal alloys can be identified by a reference scale known as the Galvanic Series, which is a measure of ionization potential of the metals alloyed together. The electrolytic current in the bi-metal couple is a measure of galvanic corrosion, which in turn is proportional to the rate of ionization of the most active or negative component in the bimetallic couple. Selection of alloys with a minimum potential difference will minimize corrosion in galvanic couples so in general, the farther apart these metals are in the Galvanic Series, the greater the potential is for a metal to ionize.

In one aspect of the process of the present invention, the process generally provides the steps of mixing the fluid to be treated or conditioned in a storage tank; transferring the fluid by means of a pump into a catalyzed cavitation reactor; passing the fluid through nozzles of the reactor whereby the fluid undergoes caviation and ionization in a controlled manner; removing the cavitated fluid from the reactor; then separating the precipitated and agglomerated solids and coalesced oils from the conditioned and treated fluid by settling or by filtration.

These and other features, aspects and advantages of the present invention will become better understood with reference to the following drawings, description and claims. For a better understanding of the invention, its operating advantages and the specific objects attained by its uses, reference should be made to the accompanying drawings and descriptive matter in which there are illustrated preferred embodiments of the invention. The foregoing has outlined some of the more pertinent objects of the invention. These objects should be construed to be merely illustrative of some of the more prominent feature and applications of the present invention. Many other beneficial results can be attained by applying the disclosed invention in a different manner or by modifying the invention within the scope of the disclosure.

Accordingly, other objects and a fuller understanding of the invention and the detailed description of the preferred embodiments in addition to the scope of the invention illustrated by the accompanying drawings.

BRIEF DESCRIPTION OF THE DRAWINGS

FIG. 6 is a cross-sectional plan top view of an embodiment of the nozzles showing a series of nozzle configurations.

DETAILED DESCRIPTION OF THE INVENTION

The following detailed description shows the best currently contemplated modes of carrying out the invention. The description is not to be taken in a limiting sense, but is made for the purpose of illustrating the general principles of the invention and the best mode for practicing the invention, since the scope of the invention is best defined by the appended claims. The invention is capable of other embodiments and of being practiced or carried out in a variety of ways. It is to be understood that the phraseology and terminology employed herein are for the purpose of description and not of limitation.

Figure 1:
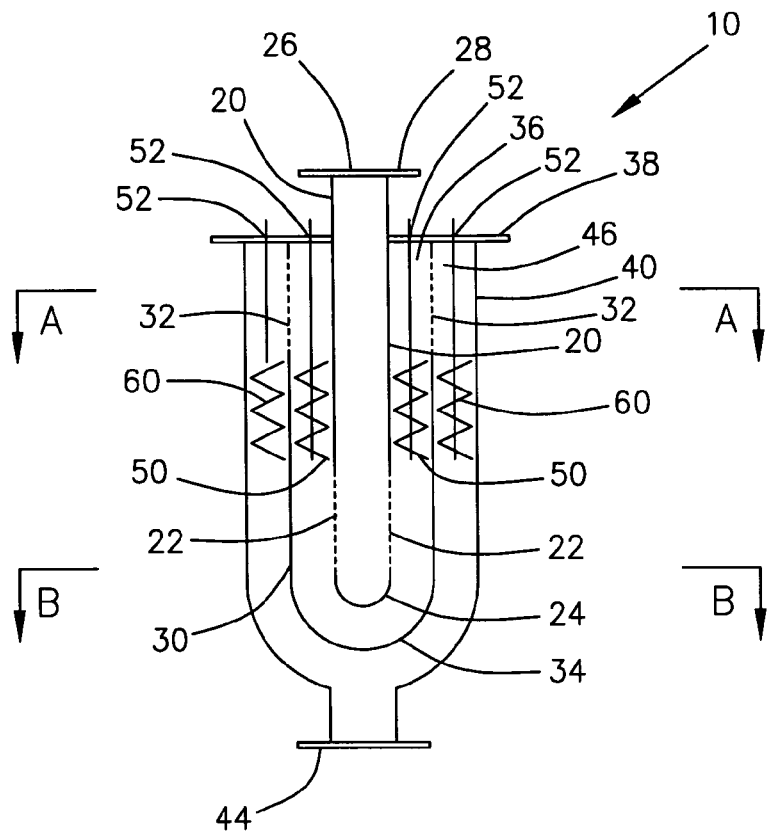
FIG. 1 is a cross-sectional plan view taken of present invention.

Referring to FIG. 1, one embodiment 10 of the present invention comprises three spaced apart concentric elongated cylindrical metal pipes, an inner pipe 20, a second pipe 30 surrounding the inner pipe 20 and an outer pipe 40 surrounding both the inner pipe 20 and the second pipe 30. Each pipe 20, 30, 40 may be made of a number of suitable structural materials, including ferrous metal, non-ferrous metal, composite materials, PVC pipe or other relevant polymer pipe, fiberglass or metal alloy. Preferably, the pipes 20, 30, 40 are made of a ferrous metal.

The wall of inner pipe 20 contains a multiplicity of spaced apart radially bored holes 22 and its exit end is closed by a cap 24. The entry end 26 of inner pipe 20 is open on one end and joined to the second pipe 30 and the outer pipe 40 by a flange 28 so that embodiment 10 can easily be connected to the pipe supplying fluid to the embodiment 10 as shown in FIG. 1 and a filter screen (not shown) of brass mesh or other similar type of mesh is fitted over the entry end 26 of inner pipe 20 to prevent intrusion of unwanted solid particles into the embodiment 10.

As shown in FIG. 1, between ¼ to ½ of the length of the inner pipe 20 opposite the opening into the inner pipe 20 contains a multiplicity of spaced apart radially bored, preferably identical, holes 22d drilled through the wall of inner pipe 20. The inner pipe 20 is itself enclosed and surrounded by a second pipe 30 having a larger diameter than the inner pipe 20. The exit end of the second pipe is closed by a cap 24 and the entrance end 36 is closed by the flange 38 having a concentric hole (not shown) in its center through which the inner pipe 20 is inserted into the interior of the second pipe 30, forming a leak-proof seal at the point where the flange 38 meets the inner pipe 20.

As further shown in FIG. 1, between ¼ to ½ of the length of the second pipe 30 opposite the exit end 34 of the second pipe 30 contains a multiplicity of spaced apart radially bored, preferably identical, holes 32 drilled through the wall of the second pipe 30. A length of static mixing baffles 50 are inserted into the interior of the second pipe 30 between the area containing the holes 22 drilled into the inner pipe 20 and the area containing the holes 32 drilled into the second pipe 30. The static mixing baffles 50 form a turbulator which serves to thoroughly mix the cavitated and catalyzed fluid that exits the inner pipe 20.

As further shown in FIG. 1, the second pipe 30 containing the inner pipe 20 is in turn enclosed and surrounded by an outer pipe 40 having a larger diameter than the second pipe 30. The exit end 44 of the outer pipe 40 is open to permit the treated and conditioned fluid to exit embodiment 10. The entrance end 46 of the outer pipe 40 is capped by the same solid flange 38 that serves to close off the entrance end 36 of the second pipe 30. A length of static mixing baffles 60 are also inserted into the interior of the outer pipe 40 downstream from the area containing the holes 32 drilled into the second pipe 30. The static mixing baffles 60 form a turbulator which serves to thoroughly mix the cavitated and catalyzed fluid that exits the second pipe 30.

The diameter of the inner pipe 20 can be any practical size, typically greater than ½inch. The diameter of the second pipe 30 must be greater than the first pipe 20 to completely enclose the inner pipe 20 and allow sufficient room for the conditioned fluid to flow through the second pipe 30, but because the second pipe 30 is not constructed of or coated with catalytically active material, the distance between the walls of the two pipes 20 and 30 is not a critical parameter affecting contact between the cavitation bubble cloud and the catalytically active material. In the same manner, the diameter of the outer pipe 40 can be any practical size as long as the outer pipe 40 completely encloses the second pipe 30 and allows sufficient room for the conditioned fluid to flow through the outer pipe 40.

The pipes 20, 30, 40 in embodiment 10 can be made of any suitable structural material including low cost materials and do not have to fabricated from expensive catalytically active alloys and metals, because the catalytically active surfaces in embodiment 10 are preferably located in the nozzles 70 instead of the pipes 20, 30, 40.

Figure 2:
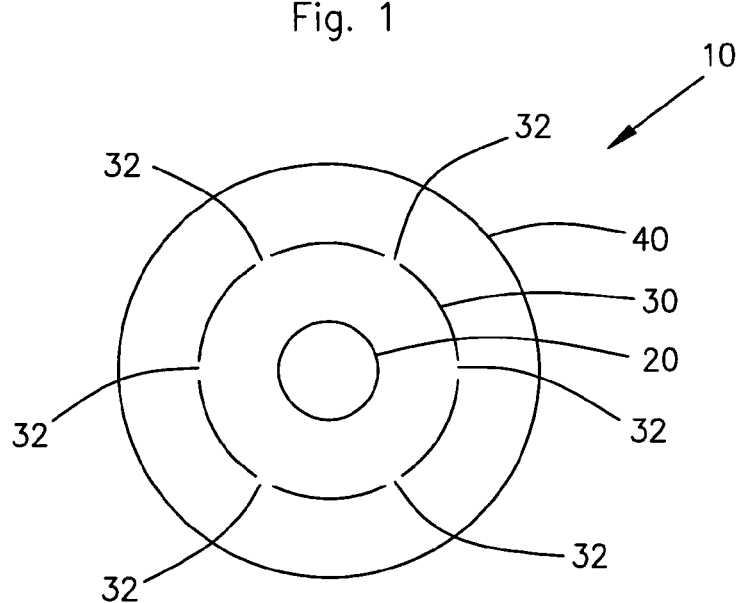
FIG. 2 is a cross-sectional top view taken of the embodiment of the present invention as set forth in FIG. 1 along line AA showing an embodiment of the injection/electrode ports.
Figure 3:
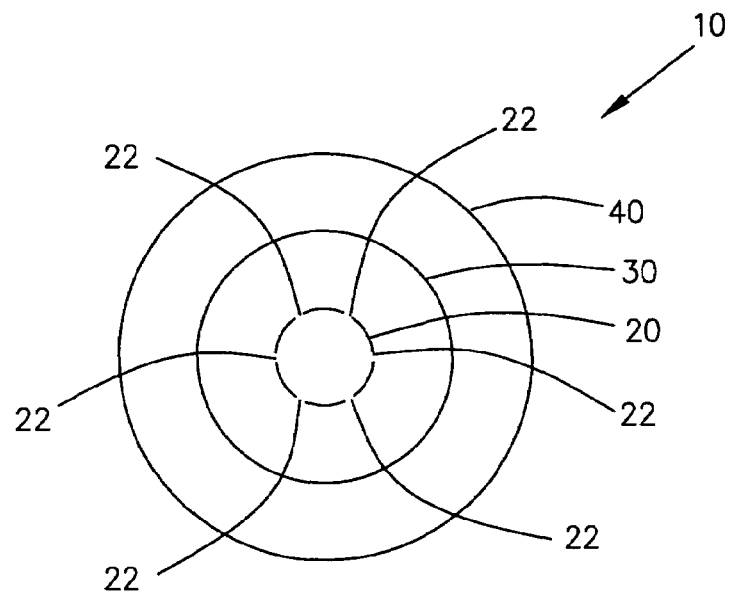
FIG. 3 is a cross-sectional bottom view taken of the embodiment of the present invention as set forth in FIG. 1 along line BB showing an embodiment of the injection/electrode ports.

Referring to FIG. 2 and FIG. 3, the flange 38 that seals off the outer pipe 40 and the second pipe 40 is equipped with a number of ports 52 that open through the walls of the flange 38 and into the interior of the second pipe 30 and the outer pipe 40. These ports 52 are normally sealed off but can be opened to allow the insertion of any number of devices including: electrodes; tubes for the delivery of reagents; thermocouples; sensors or other related devices into the interior of the second pipe 30 and the outer pipe 40.

Figure 4:
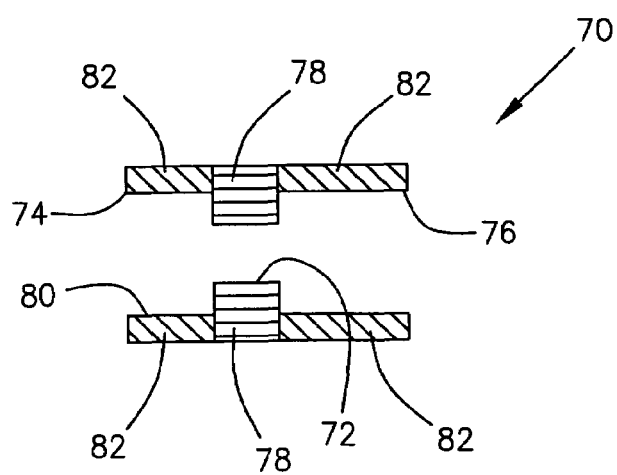
FIG. 4 is a cross-sectional plan view taken through the center of an embodiment of the nozzle showing two views of the constriction insert and catalytic material area.

Referring to FIG. 4, nozzles 70 are fitted into the multiplicity of spaced apart radially bored, preferably identical, holes 22 and 32 drilled through the walls of the inner pipe 20 and second pipe 30. The nozzles 70 are specially designed to create controlled, optimized cavitation and catalysis within the fluid passing through the nozzles. The nozzles 70 form a constriction or vena-contracta 72 through which the fluid is pumped under sufficient pressure so that the velocity of the fluid passing through the constriction is greatly increased, resulting in cavitation of the fluid exiting the constriction.

The nozzles 70 can be inserted into the holes 22 and 32 in the walls of the inner pipe 20 and second pipe 30 at any angle to optimize the flow pattern of the jets of fluid exiting the nozzles 70. The preferred angle of insertion is 22.5 degrees to stimulate turbulent flow in the mixing area that forms downstream from the nozzle discharge end 74.

The sum of the cross-sectional areas of the multiplicity of openings in the nozzles 76 should equal or, preferably, be 2 times the cross-sectional area of inner pipe 20 in order to prevent any back pressure or flow restriction during operation of embodiment 10. Moreover, the jet velocity, or the velocity of the liquid or gas jets as they exit from the nozzles 70, should be at least 0.01 feet per second. For this embodiment, the formula for computing the jet velocity in feet per second of the liquid or gas existing from the openings in the nozzles 70 is 4,085 times the gallons (3.785 liters) per minute divided by the square of the diameter of the openings in the nozzles 70.

The constriction 72 is formed of erosion resistant material including carbide, tungsten, quartz, stellite, titanium nitride, ceramics, alpha alumina, diamond and related hardened materials, that resist corrosion and stand up to the forces found in the high pressure, high velocity fluid environment. The constriction material may be made in the form of an insert 78 that can be incorporated into the wall of the nozzle 70.

Adjacent to and directly downstream from the constriction 72, the nozzle 70 forms a catalytically active area or zone 80 that is constructed from catalytically active materials, including cobalt, molybdenum, bismuth, lanthanum, iron, strontium, titanium, silver, gold, lead, platinum, tin, palladium, yttrium, zirconium, calcium barium, potassium, chromium, magnesium, manganese, copper, zinc and mixtures thereof. The catalytically active materials can also be plated or coated onto base material that forms the nozzle 70. In addition, the catalytic material can be alloys of iron, tin, nickel, aluminum, silver, copper and zinc and related alloys. Selection of the catalyst depends upon the type and nature of the chemical reaction to be promoted within the catalyzed cavitation zone 80.

As illustrated in FIG. 6, the catalytically active area 80 can be constructed in various dimensionally different shapes to maximize the surface area for catalyzed cavitation. Shapes include a straight cylindrical barrels 102, single 104 and multi-chambered cylinders 106, venturis 108, converging or diverging cones 110, threaded cylinders 112 and ball or spherical chambered cylinders 114.

Ionization of the fluid is optimized when cavitation occurs at the surface of materials that are readily ionized. Brass, other copper-zinc alloys, copper-aluminum and other dissimilar metal couples are ideal materials to release ions in the presence of a conductive and cavitating fluid.

On significant advantage of embodiment 10 of this present invention is the incorporation of two areas for catalyzed cavitation separated from each other by a first turbulator 51 where the second area of catalyzed cavitation is also followed by a second turbulator 61. The turbulation zones allow for complete mixing of the ionized fluid and the ionized particles to improve separation of contaminants and purification of the fluids.

Another significant advantage of embodiment 10 is the presence of injection ports where by additional oxidants, reactants and reagents can be introduced into the conditioned fluid and into the catalyzed cavitation zones of embodiment 10 to enhance and promote novel chemical reactions.

Gasoline, diesel fuel, propane and other hydrocarbon fuels that can be treated in embodiment 10 should disassociate from contaminants in the fuel, facilitating the removal of sulfur from the fuel and resulting in a cleaner burning fuel. This results in more complete combustion and reduced emissions.

Treatment of crude oils, lubricating oils and hydraulic oils in embodiment 10 breaks up the long chain hydrocarbon molecules in the oil, making the oil less capable of transporting suspended solids. Treatment of crude oils in embodiment 10 increases the American Petroleum Institute specific gravity of the crude by at least two to three points and also breaks up the long chain hydrocarbon and paraffin molecules in the crude oil, thereby increasing the marketability of the treated crude oil.

Treatment of used hydraulic oils through embodiment 10 precipitates suspended particles and restores the performance of the used oil. Treatment of virgin or new hydraulic oils eliminates its tendency to accumulate pump varnish and other suspended particles. Treated lubricating oils exhibit greater lubricity and reduce friction between the lubricated components.

Water treated and conditioned by embodiment 10 exhibits reduced tendency to form hard calcite scale, reducing or eliminating the need for water-softening chemicals, and the conditioned water removes existing scale from heat exchanger surfaces found in boilers, cooling towers and evaporators. In addition, treatment of the water prevents corrosion in the boiler tubes.

Catalyzed Cavitation treatment followed by filtration softens drinking water, enhancing the taste, odor and color of the drinking water. Embodiment 10 can also be sued to clean up ballast water prior to disposal, facilitating the removal of oil from the water.

The invention has further uses in the purification of waste water and other grey water wastes, including: car wash water; algae infested pond-water and water in fountains; mine wastes and tailings; coal slurries; and fertilizer run-off.

While we have illustrated and described preferred embodiments of our invention, such disclosures should not be regarded as any limitation of the scope of our invention. The true scope of our invention is defined in the appended claims.

As has been demonstrated, the present invention provides an advantageous apparatus and method for maintaining alignment and balance of a massive rotating cylindrical drum within close tolerances. While the preferred embodiments of the present invention have been described, additional variations and modifications in those embodiments may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. A catalytic cavitation reactor comprising:
   an inner pipe having a wall with plurality of spaced apart radially bored inner pipe holes located thereon, an entry end and an exit end having a cap thereon;
   a second pipe, joined to said inner pipe, having a wall with plurality of spaced apart radially bored second pipe holes located thereon, an entry end and an exit end having a cap thereon, said inner pipe located within said second pipe;
   a length of static mixing baffles are inserted into the interior of said second pipe between the area containing the inner pipe holes and the second pipe holes;

an outer pipe, joined to said second pipe, an entry end and an exit end having a cap thereon, said second pipe located within said outer pipe;

a length of static mixing baffles are inserted into the interior of said outer pipe between the area containing the second pipe holes and the outer pipe holes; and a plurality of nozzles, wherein each of said inner pipe holes and second pipe holes receives one of said plurality of nozzles, each of said plurality of nozzles having an inlet end, an outlet end and a constriction therebetween, a catalytically active zone is formed between said said constriction and said outlet end.

2. The reactor of claim 1 wherein each of said plurality of nozzles is positioned in each of said inner pipe holes and second pipe holes at an angle relative to the wall of the respective pipes.

3. The reactor of claim 2 wherein said angle is 22.5 degrees relative to the wall of the respective pipes.

4. The reactor of claim 1 wherein said constriction is formed from erosion resistant material.

5. The reactor of claim 4 wherein said catalytically active zone is formed by catalytically active material.

6. The reactor of claim 1 wherein said catalytically active zone is dimensionally formed as a straight cylindrical barrel.

7. The reactor of claim 1 wherein said catalytically active zone is dimensionally formed as a single cylinder.

8. The reactor of claim 1 wherein said catalytically active zone is dimensionally formed as a multi-chambered cylinder.

9. The reactor of claim 1 wherein said catalytically active zone is dimensionally formed as a venturis.

10. The reactor of claim 1 wherein said catalytically active zone is dimensionally formed as a converging cones.

11. The reactor of claim 1 wherein said catalytically active zone is dimensionally formed as a diverging cones.

12. The reactor of claim 1 wherein said catalytically active zone is dimensionally formed as a threaded cylinder.

13. The reactor of claim 1 wherein said catalytically active zone is dimensionally formed as a ball chambered cylinder.

14. The reactor of claim 1 wherein said catalytically active zone is dimensionally formed as a spherical chambered cylinder.

15. The reactor of claim 1 wherein the diameter of inner pipe is greater than ½ inch.

16. The reactor of claim 1 wherein the sum of cross-sectional areas of said plurality of nozzles located in said inner pipe holes is approximately 2 times the cross-sectional area of said inner pipe.

17. A method for the separation of contaminants within a fluid comprising:

mixing a fluid containing contaiminants;

transferring said fluid into a reactor having nozzles as defined by claim 1;

passing said fluid through said nozzles causing cavitation and ionization of said fluid;

removing said fluid contaiminants from said fluid.

* * * * *